Nov. 26, 1957 F. R. MALLALIEU 2,814,675

INTERCOMMUNICATING TELEPHONE EQUIPMENT

Filed Feb. 13, 1956 3 Sheets-Sheet 1

INVENTOR
FRANK R. MALLALIEU
BY
ATTORNEYS

Nov. 26, 1957 F. R. MALLALIEU 2,814,675

INTERCOMMUNICATING TELEPHONE EQUIPMENT

Filed Feb. 13, 1956 3 Sheets-Sheet 2

INVENTOR
FRANK R. MALLALIEU
BY
ATTORNEYS

INTERCOMMUNICATING TELEPHONE EQUIPMENT

Filed Feb. 13, 1956 3 Sheets-Sheet 3

INVENTOR
FRANK R. MALLALIEU
BY
ATTORNEYS 2,814,675

INTERCOMMUNICATING TELEPHONE EQUIPMENT

Frank R. Mallalieu, Oxford, Pa.

Application February 13, 1956, Serial No. 565,089

11 Claims. (Cl. 179—38)

Figure 1:
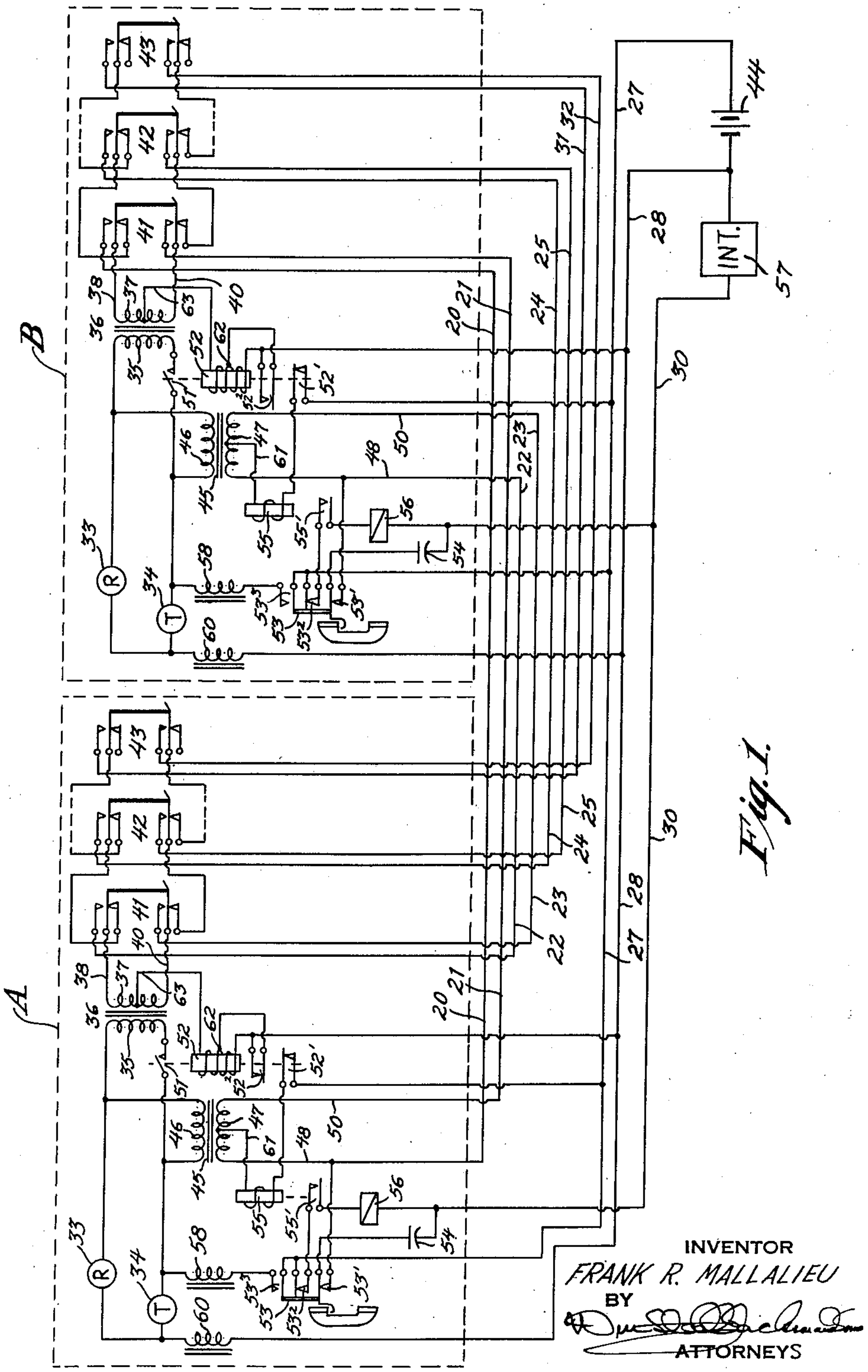

The present invention relates to intercommunicating telephone equipment of the direct call secrecy type.

A purpose of the invention is to provide a self shunting relay type lock-out circuit with a transformer interposed, having one of the windings in the local talking circuit, thus avoiding operational failures when two power sources become accidentally connected together and permitting operation from a single direct current power source, preventing polarization of the talking line, so that reversal of connections will not interfere with functioning.

A further purpose is to introduce intermittent ringing in an intercommunicating telephone equipment of the direct call secrecy type.

A further purpose is to provide perfect privacy with commercially satisfactory operation in a direct call secrecy intercommunicating telephone equipment.

Further purposes appear in the specification and in the claims.

In the drawings I have chosen to illustrate a few only of the numerous embodiments in which my invention may appear, selecting the forms shown from the standpoints of convenience in illustration, satisfactory operation and clear demonstration of the principles involved.

The drawings show circuit diagrams illustrating circuits of the invention.

In the prior art, attempts have been made to use self-shunting relay type lock-out circuits in intercommunicating telephone equipment. This type of lock-out offers special advantages when combined with a transformer coupling system for voice currents as described in my copending application, Serial No. 512,139, filed May 31, 1955, for Direct Call Secrecy Intercommunicating Telephone Equipment.

One of the difficulties in the prior art self-shunting relay type lock-out circuits is that they have necessarily produced continuous ringing which is very objectionable from the standpoint of the user. U. S. Patent 2,565,192 is an illustration of an intercommunicating telephone system with a self shunting relay type lock-out, employing no transformer, and producing continuous ringing at the called set. U. S. Patent No. 2,181,715 is another illustration of an improved lock-out circuit which produces continuous ringing at the called set.

The present invention uses an improved lock-out, but overcomes entirely the trouble incident to continuous ringing, and provides an interrupter associated with the audible signal at each set or feeds interrupted potential from a central interrupter so that the signals sound intermittently. It is thereby possible to have perfect privacy without the objectionable feature of continuous ringing.

In general the device of the invention has a call receiving relay, an auditory signal which is actuated through contacts of the call receiving relay, and a current interrupter and source of power for operating the signal. In a preferred form, the inter-communicating set includes a transformer, a privacy relay, and contacts of the privacy relay inserted in a circuit comprising the transformer winding connected with the local talking circuit rather than with the outgoing line portion.

In one desirable form of the device of the invention, two transformers are used, contacts of the privary relay being inserted in the circuit comprising the local talking circuit and the winding of one transformer, and the winding of a second transformer being connected directly to the local talking circuit with the second windings of the two transformers being connected respectively to the outgoing line portion and the home line or call receiving line portion of the circuit.

In a very desirable form of the invention, the local signal or the local signal relay is connected to the center tap of a transformer winding connected to the home line, via hook switch contacts and with the coil of the privacy relay connected to the center tap of the winding connected to the outgoing line multiple by a ringing switch.

In one very advantageous form, the relay which operates the local signal is connected to a center tap of the winding connected to the outgoing line multiple, the privacy relay having a make contact arranged to lower the effective resistance of the coil of the privacy relay when it operates, and with a break contact on the privacy relay to indicate that its own home line is busy by opening the circuit between the center tap of the transformer winding connected to the home line and the power source.

The relay which operates the local signal need not be used, and the local signal can itself be connected between the center tap of the winding connected to the home line and the uninterrupted power source, which provision of hook switch means to break off the signal when the hand set is elevated and to insert a resistance of suitable value in the circuit.

The signal may be connected to either home line or to both lines directly or through resistances, and provision made by hook switch means to restore the lines individually to the ends of the appropriate transformer winding, and with an element having suitable resistance connected between the center tap of the said transformer winding and the power source. In the prior art of direct line secrecy type intercommunicating telephone equipment, there have been several different methods of providing privacy or secrecy of conversation. One such method has caused the difficulty that the test relay is not capable of blocking the called line during the ringing period. Several other proposals have been made which eliminate this difficulty, but these improvements themselves have the disadvantage that they cause uninterrupted ringing until the telephone is answered. The present invention on the other hand obtains improved results from the standpoint of privacy or secrecy, without the objection of continuous ringing.

It is also advantageous in the present invention that manual ringing is not necessary and ringing is accomplished automatically.

In the prior art, the practice has been to signal over one side of the line pair. Privacy relay contacts were introduced between the outgoing line multiples and the transformer coupling in the local talking circuit. In accordance with the present invention, on the other hand, the contacts are inserted in the winding of the transformer directly connected to the local talking circuit and the line side of the transformer is permanently connected to the talking line multiple. The privacy relay is connected to the center tap winding and the call receiving relay is connected to the center tap of a winding connected to the home line. Therefore in effect the signal is carried out over a simplex circuit. In a simplex circuit variations in current in the simplex circuit are balanced out and do not affect the main line circuit, thereby permitting the use of an improved type of lock-out circuit in which the busy mark is applied to the called set the instant a calling switch is operated to connect to it and the mark is held until the connection is again broken.

The invention lends itself to the inclusion in a system of this type, where the busy marking method would cause continuous actuation of the call receiving relay, of an interrupter element which provides automatic intermittent ringing. The prior art practice has been to use manual ringing, or, if automatic ringing occurred upon operation of the call selection switch, the ringing has been continuous until answered. The continuous and automatic ringing has been very unpopular with users and therefore most sets have employed a push button or other type of ringing switch to produce actuation of the audible signal at the called station.

Figure 1 shows a portion of the intercommunication multiple and another connected set B as well as an initial set A produced according to the invention. There may, of course, be any desired number of sets. The wiring multiple between the sets consists of wires 20, 21, 22, 23, 27, 28 and 30, as well as wires 24, 25, 31 and 32 which are also connected to another set not shown, and suggest that additional sets will of course be included.

Each set includes a local talking circuit from which all condensers have been eliminated, comprising a receiver 33 and a transmitter 34 in a circuit comprising a primary 35 of a transformer 36 which has a secondary 37. The secondary is connected to outgoing line portions 38 and 40 which communicate with calling switch 41 connecting in set A to outgoing lines 22, 23, calling switch 42 connecting to lines 24, 25 and calling switch 43 connecting to outgoing lines 31, 32. The transformer 36 isolates the signalling and talking portions of the circuit for D. C. and one D. C. power supply 44 is all that is required connected to the wires 27 and 28 and also, as later explained, to the wire 30.

While any of the transformer arrangements shown in my copending application above referred to can be used, it is preferred to employ in this embodiment two separate transformers, with one winding of each connected across the local talking circuit. Transformer 36 has its opposite winding connected to the outgoing lines. Transformer 45 has one winding 46 connected across the loop including the receiver 33 and the transmitter 34 in parallel with the winding 35 of the transformer 36. The other winding 47 of the transformer 45 is connected to leads 48 and 50 which respectively communicate with the home line of the particular set.

This novel arrangement permits the insertion of contact group 51 of privacy relay 52 in the circuit of winding 35 of transformer 36, rather than in the outgoing line circuit. This gives rise to the possibility of improved privacy circuits and gives an advantage regardless of the privacy method used because fewer contact groups are required on privacy relay 52 with consequent saving in the cost of parts and wiring.

The hook switch 53 has a normally closed contact 53′ in circuit between capacitor 54 (connected to line 30) on one side and homeline 20 for station A or 22 for station B. Hook switch 53 has also a normally closed contact 53² connected between line 27 on one side and the normally open relay contact 55′ of relay 55, the opposite side of the relay contact 55′ being connected through audible signal 56 to power line 30 which is connected through interrupter 57 to the negative side of the battery. Hook switch 53 also has a normally open contact 53³ connected at one side to line 27 and at the other side through choke coil 58 to the local talking circuit on one side of the transmitter 34. The local talking circuit at the opposite side of transmitter 34 is connected through choke coil 60 to line 28 which is connected to the negative side of the power source.

Privacy relay 52 has normally closed contacts 52′ which are connected between the positive side of the power source at line 27 and the coil of relay 55, the opposite side of which is connected to center tap 61 of transformer winding 47. Privacy relay 52 also has normally open contacts 52² which are connected between the negative side of the power source at wire 28 and an intermediate tap 62 on the coil of privacy relay 52 which introduces a coil portion of reduced impedance in the circuit to center tap 63 of transformer winding 37.

Now considering the operation of the sets, if one set A in Figure 1 initiates a call to set B, switch A41 is operated, connecting the ends of winding A37 to lines 22 and 23. A path of signalling current is then set up from the negative side of the power source through wire 28, through the coil of privacy relay A52, through winding A37 of transformer A36, where the current divides and flows through switch A41 and lines 22 and 23 to winding B47 of transformer B45, wherein both branches of the current join through the coil of relay B55 normally closed contact group B52′, wire 27 and then return to the positive side of the power source. Both relays then operate. Relay B55 upon closing its contacts B55′, sounds audible signal B56, which is deenergized when the hand set is lifted to open contact B53² of hook switch B53.

It will be evident that the question of whether the audible signal is operated by a relay as here shown or whether it is interposed directly between the center tap 61 of transformer winding B47 and the uninterrupted power supply line, with contacts on the hook switch B53 to cut off the signal and insert a suitable impedance, preferably a resistance, is largely immaterial. In the last alternative the audible signal may be a single stroke bell or chime.

Privacy relay A52 also operates, closing contact group A51 and preparing a circuit for talking through transformer A36. The hand set, transmitter and receiver have become energized by closing normally open contacts A53³ when the hand set is lifted, by reason of power fed from lines 27 and 28 through feeding coils A58 and A60. It will be evident, of course, that equivalent elements such as resistors may be used instead of the feeding coils.

When the user lifts the hand set at set B, the local talking circuit is energized through feeding coils B58 and B60 and the closing of normally open contacts B53³ of the hook switch. Voice currents through winding B46 of transformer B45 are transferred to winding B47 and thence to wires 48 and 50 and wires 22 and 23, thence through switch A41 in operated form to winding A37 of transformer A36. Thus two-way conversation may be carried between the two sets.

Current is flowing through the simplex circuit set up between the center taps of winding A37 and B47. In accordance with the principles of simplex circuits, any variations in the current through the relays will be balanced out of the talking circuit. Therefore if desired another power source which may be less expensive, for example because its output contains an appreciable ripple voltage, might be used to supply these relay circuits, reserving the more expensive and purer direct current for use only in the talking circuits. Of course another pair of feeder lines would then be needed.

When privacy relay A52 operated, its contact group A52² closed, shorting out a portion of the winding of the relay. Relay A52 is designed to hold operated even when a major portion of its winding is shorted out, so that the local talking circuit which depends on holding contact A51 closed will not be broken. If a second similar set, which will be called set C (not shown on Figure 1) should call set B, privacy relay C52 will not operate because it will be connected essentially in parallel with privacy relay A52 and the current through relay B55 will divide through a parallel circuit comprising the coils of privacy relays A52 and C52 in inverse ratio to the respective resistance. As privacy relay C52 has not yet operated, it is in its high impedance or high resistance state, while privacy relay A52 is in its low impedance or low resistance state. Accordingly privacy relay A52 will carry most of the available current and only a very small portion of the total current will flow through the coil of privacy relay C52.

A relay which will reliably operate and hold and reliably fail to operate under the various conditions can be readily designed on the basis of the skill of an ordinary relay designer. As an example, where a 24 volt source is employed, the coil resistance for relay 55 should be about 350 ohms, and the resistance of the portion of the coil of privacy relay 52 which is shorted out should be about 400 ohms and the resistance of the portion which is not shorted out should be about 50 ohms. It will of course be evident that the question of whether a tapped winding should be used as shown, in preference to two separate windings which are cut in and out of the circuit by contact operation, is immaterial. If separate windings are used for the same relay, the windings can be designed with the desired resistances. Or a resistor can be introduced in the circuit if desired.

When privacy relay A52 operated it also opened the circuit comprising the coil of relay A55 at contact group A52′, thus marking set A busy. When the hand sets are replaced in their cradles calling switch A41 is restored either manually or by mechanism operated by the weight of the hand set at the end of the conversation, the relays fall back, and the sets are in condition to operate again.

It will be evident that the sets just described embody an important improvement in privacy operation as compared with those in the prior art. In the prior art sets the busy mark resulted from the disconnection from the homeline of the relay which operated the signal at the called station. This operation did not occur until the call was answered. Therefore during the ringing period the set was not marked busy to other calling sets. Accordingly in the prior art it was possible for two calling sets to become connected to and retain connection with a single called set. Also it was possible in the prior art for a calling party to designedly fail to restore his hand set and calling switch at the end of a conversation and thus retain a connection to the set which he had once called as long as he desired. The once called set was not marked busy when its hand set had been replaced in the cradle and therefore the party retaining connection could listen in on calls to the once-called set without the knowledge of the other parties.

In the present invention, neither of the above breaches of privacy could occur. If connection is retained to a set that has been called, no third party can call the retained line and eavesdropping is not possible. Furthermore, since the once-called set is marked busy as soon as the calling relay operates, no other set can connect to the line of the called station during the ringing period. Even if it were possible for two calling relays to operate on the same circuit at the same instant, the relay design as well known, can prevent both relays from holding, requiring one to drop out and thus locking it out.

One of the important advantages of the present invention is the provision for automatic ringing. In the form of Figure 1, no ringing key is required and ringing is caused at the called set by the operation of relay 55. If the contacts of this relay and the audible signal are connected to the direct current power source, ringing will be continuous. Previously efforts have been made to avoid the difficulties of the old privacy circuit method by providing improved circuits but they have used continuous ringing which has been very distasteful to those employing the sets.

In accordance with the present invention an interrupter is provided which automatically accomplishes interrupted ringing. The interrupter may be incorporated in each set, in the circuit of the local buzzer, but it is preferable to use a master interrupter at the central power supply with a feeder line for interrupted power included in the group of line wires, as shown in Figure 1. The interrupter 57 may be any suitable interrupter, such as a motor driven cam switch, an all-relay interrupter, or a thermostatic flasher, among various choices. A single wire 30 carries the interrupter current and wire 27 acts as a common return for both interrupted and uninterrupted power. Of course it will be evident that a separate pair may be used to carry the interrupted power and this will be particularly desirable if clicks are induced in the common wire 27 by the interrupted power, or if an alternating current signalling power source is used. In this case, further alternates for the interrupter are available, including saturable reactors, electronic gating circuits or self-blocking types of oscillators.

A condenser 54 of low capacity is introduced along with hook switch contacts 53′ to give a simple form of ring-back or tone which indicates that ringing is proceeding. If a full pair is used it is preferable to use a condenser on each side of the audible signal.

In Figure 1 I employ two transformers as shown in connection with the improved privacy relay of the invention. The principles of the invention may however be employed in connection with the older method of privacy relay operation as described in my copending U. S. patent application, Serial No. 512,139, by connecting the relay which operates the signal or the signal itself to the center tap of transformer winding 47 through hookswitch contacts so that it will be disconnected when the hand set is taken up, and interposing a ringing switch between the coil of the privacy relay of the older type and the center tap of winding 37, or either end of winding 37 in case the center tap is omitted, and using holding contacts on the privacy relay as shown in said patent application.

Figure 2:
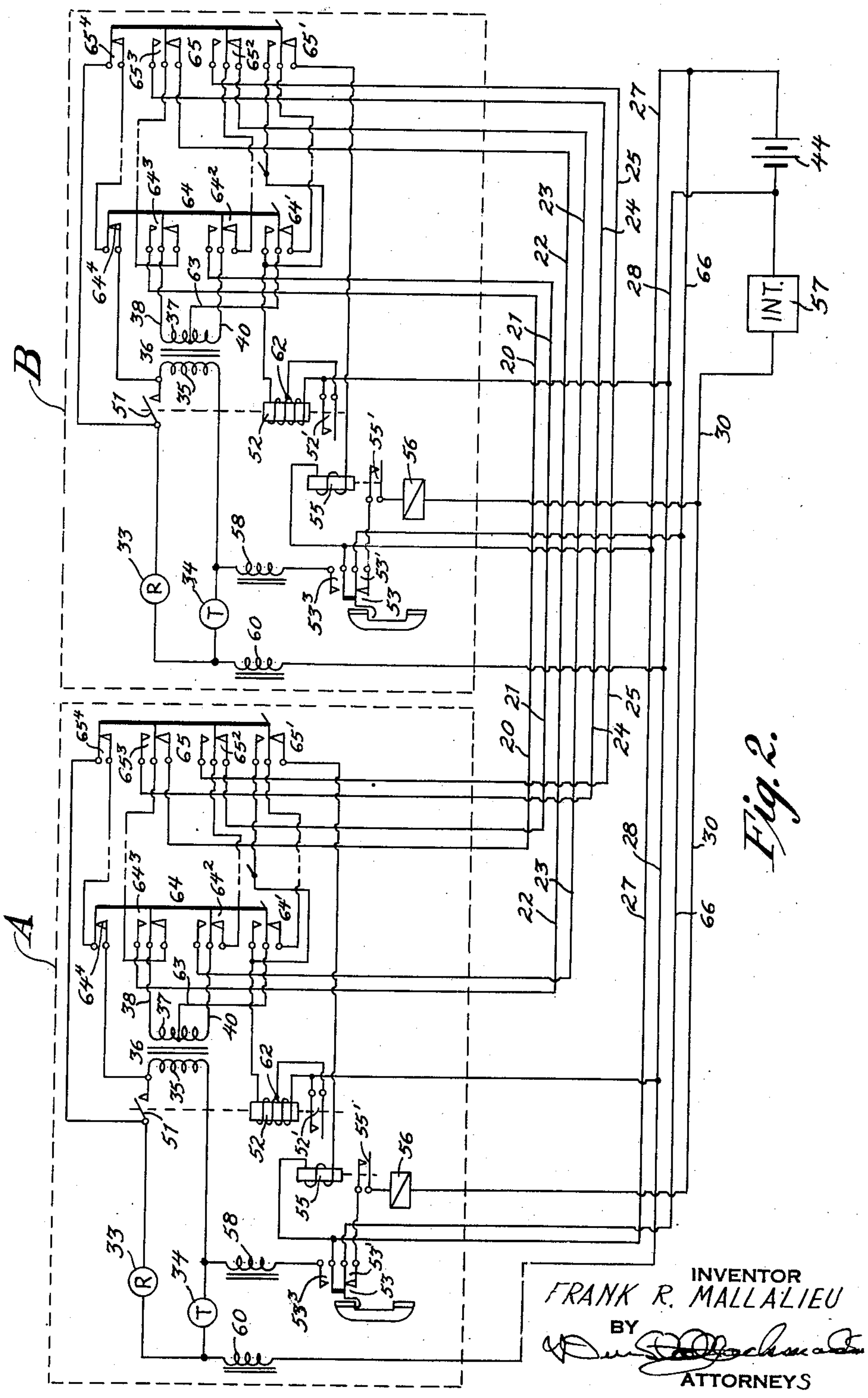

The circuit of Figure 2 uses only one transformer with only two windings to replace the two transformers in Figure 1, but it does this at the expense of additional contacts on the calling switches 64 and 65. The calling switch 64 has a contact cluster 64′, a contact cluster 64² and a contact cluster 64³, each including a contact maker engaging a normally closed contact and adapted to shift to a normally open contact, and a contact cluster 64⁴ including normally closed contacts, while the calling switch 65 has similarly contact clusters 65′, 65² and 65³ each including contact maker engaging a normally closed contact and adapted to shift to a normally open contact, and normally closed contacts 65⁴.

The contact maker of contact cluster 64′ is connected to the center tap 63 of transformer winding 37, while the normally closed contact is connected to the contact maker of contact cluster 65′ and the normally open contact is connected to one side of the unshunted portion of privacy relay 52, the opposite side being connected through normally open contacts 52′ to the negative wire 28 and through the whole coil of relay 52 directly to the negative wire 28.

The contact maker on contact cluster 64² is connected to one side of transformer coil 37, the normally closed fixed contact of this contact cluster is connected to the contact maker of contact cluster 65² and the normally open fixed contact is connected to one side of the homeline of station B.

The contact maker of contact cluster 64³ is connected to the opposite side of transformer winding 37, the normally closed fixed contact of this cluster being connected to the contact maker of contact cluster 65³ and the normally open contact of this contact cluster being connected to the other side of the homeline of station B.

A line is run from the local talking circuit at one side of contacts 51 through normally closed contacts 64⁴ and 65⁴ to the local talking circuit at the other side of contacts 51.

In this circuit normally closed hook switch contacts 53′ are connected at one side to a return line 66 connected to the positive side of the power source to provide a return for the interrupted current, and at the other side through normally open contacts 55′ and the audible signal 56 to the interrupted power line 30 on the negative side of the source.

Normally open hook switch contacts $53^3$ are connected at one side to positive power line 27 and to one side of the coil of relay 55, the other side of which relay coil is connected to the normally closed fixed contact of contact group 65'. The other side of contact group $53^3$ is connected to feeder coil 58.

The normally closed fixed contact of contact group $65^2$ is connected to one side of the homeline and the normally closed fixed contact of contact group $65^3$ is connected to the other side of the homeline, while the normally open fixed contact of contact group $65^2$ is connected to line 25, and the normally open fixed contact of contact group $65^3$ is connected to line 24.

It will be understood that as many calling switches are provided as there may be stations.

Each of the calling switches comprises two main selection chains which connect winding 37 to the called line when they are operated, and two other contact groups 64' and $64^4$; 65' and $65^4$ etc.

If set A in Figure 2 calls set B by operating calling switch A64, the ends of winding A37 are connected to lines 22 and 23, which constitute the homeline pair of set B. At contact group A64' the coil of privacy relay A52 is connected to the center tap of winding A37. A circuit for signalling is then set up from the negative power source through wire 28, the coil of privacy relay A52, the make contact A64' with switch 64 operated, winding A37, where the current divides, the make contacts $A64^2$ and $A64^3$, wires 22 and 23 to set B, then through break contacts of all the switches (none operated) to winding B37 where the current paths join, then center tap B63 of winding B37, then the break contact of group B64', other break contacts, the coil of relay B55, wire 27 and positive power. Thus both relays operate.

At set B the operation of relay B55 closes contacts B55' and through the break contact 53' on hook switch 53 audible signal B56 is actuated from the interrupted power transmitted through lines 66 and 30.

At set A the operation of the privacy relay A52 results in lowering the effective resistance of the coil of the relay A52 by shunting a portion of the coil through the action of contact group A52' or by equivalent means, as previously mentioned. Thus set B is marked busy and no other calling set can gain access to set B. The operation of privacy relay A53 also closes contact group A51, completing the local talking circuit and permitting voice currents to circulate in the loop comprising transmitter A34, receiver A33, contact A51 and winding A35. These talking currents are transferred to winding A37 by transformer action and are carried to set B and winding B37 by line circuits previously described. At set B the local talking loop comprises transmitter B34, receiver B33, contacts $B64^4$ and $B65^4$ of the calling switches and winding B35.

It will thus be observed that when any switch is operated to call, this chain through contacts $B64^4$ and $B65^4$ is broken and talking is then only possible when privacy relay 52 is operated. When receiving a call, however, no calling switch is operated and the fully closed chain of contacts $64^4$ and $65^4$ permit conversation.

It will be evident that this circuit provides a unique form of busy signal. In calling, if the called line is busy, privacy relay 52 does not operate and the receiver 33 at the calling station sounds completely "dead." If the called set is not busy, on the other hand, the receiver sounds "live" as soon as the calling switch is thrown. This renders unnecessary the inclusion of additional components and wiring to produce a busy signal, thus reducing the cost.

Figure 3:
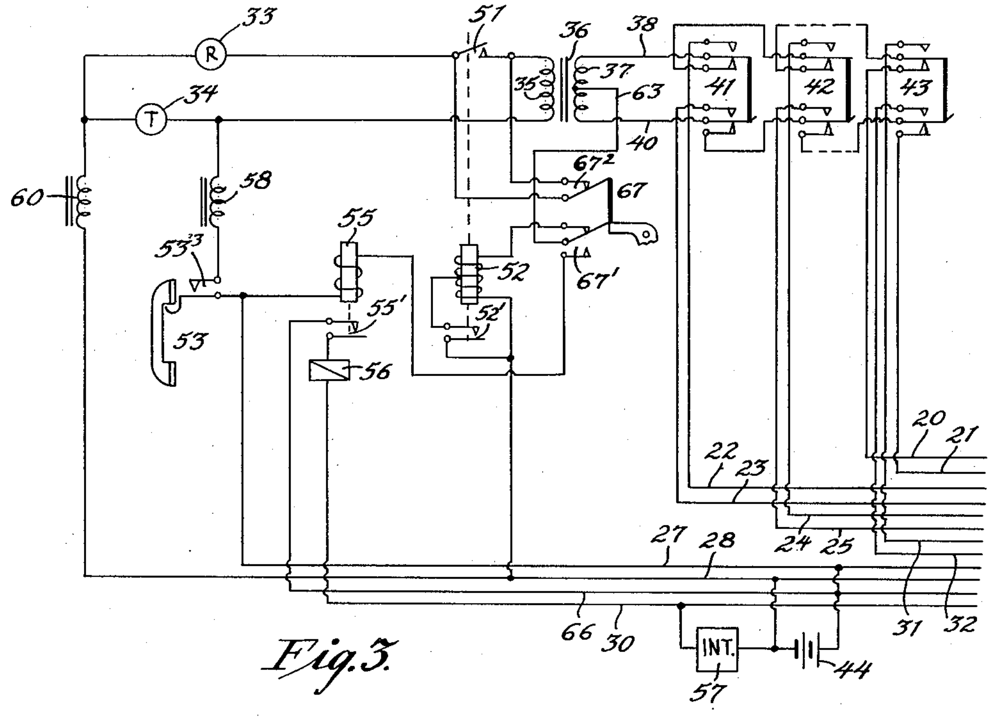

Figure 3 illustrates another form which bears a close resemblance to that of Figure 2.

In the form of Figure 3 the additional contact groups which were formerly employed on each of the calling switches have been eliminated and replaced by a single switch element 67 having contact groups 67' and $67^2$. Contact group 67' has its contact maker connected to the center tap 63 of transformer coil 37 and has its normally closed fixed contact connected to one end of the unshunted winding of privacy relay coil 52, the tap of the winding being connected to one side of normally open contacts 52' which on the other side are connected to wire 28. The remote end of the shunted portion of privacy relay winding 52 is also connected to wire 28.

The normally open contact of contact cluster 67' is connected through the coil of relay 55 to wire 27, and also through normally open contact cluster $53^3$ with feeding coil 58 and with the talking circuit loop.

Wires which shunt contact group 51 in the talking circuit loop are connected to normally closed contact cluster $67^2$.

The homelines 20 and 21 of the station are connected to normally closed fixed contacts of calling switch 43.

Since the operation of the set of Figure 3 is the same as that of Figure 2 except for the functioning of switch 67, it will suffice to describe the operation of this switch. Switch 67 is operated, as well known, by mechanical mechanism whenever any calling switch is operated. Thus any calling switch will simply mechanically deflect the operating arm of switch 67. Once this is accomplished, it will be evident that the functioning is the same as that of Figure 2.

Figure 4:
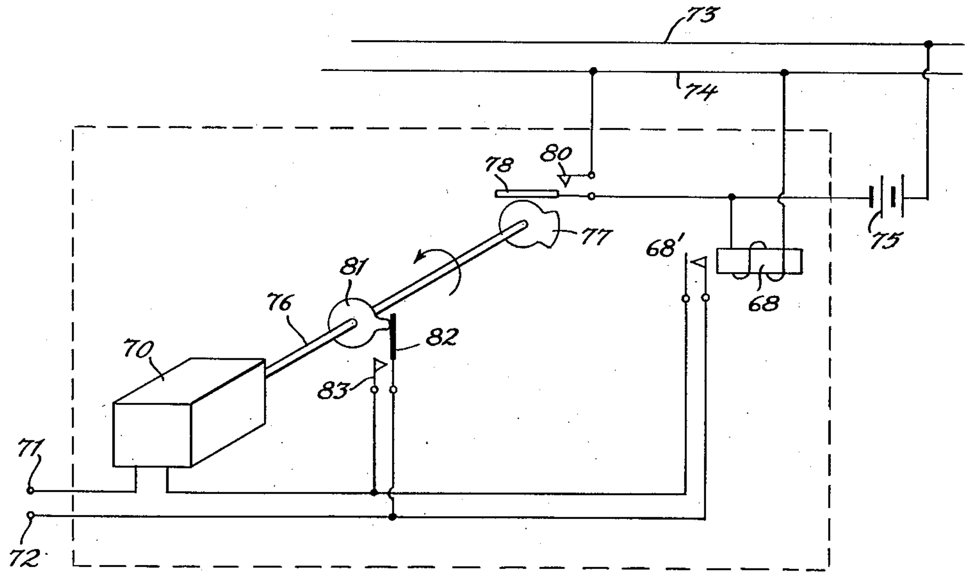

Figure 4 shows a modified form of current supply for interrupted ringing according to the invention. In the form of Figure 4 the interrupter is only operated when it is required, thus reducing wear on the interrupter. The relay 68 is employed, having normally open contacts 68' which are connected in series with interrupter motor 70 across a suitable power source connected at 71 and 72.

The relay 68 is a high resistance relay. One side of ringing supply source 75 is permanently connected to ringing supply feeder 73 and the other side of the ringing supply source is connected to one side of the coil of relay 68, the other side of which is connected to ringing supply feeder 74. When an audible signal at one of the sets is connected to the ringing feeders by operation of a signal receiving relay such as relay 55 in Figure 1, relay 68 operates, without operating the signal of the set just mentioned. Relay 68 is chosen so that, with its high resistance coil, the current passing through the coil of relay 68 is sufficient to operate the relay but not sufficient to operate the audible signal. If the relay coil has a resistance of 1000 ohms and the audible signal has a resistance of about 200 ohms, for example, the desired result is obtained. When the relay 68 operates closing its contact 68', interrupter motor 70 starts, driven by power from the source at 71, 72. Motor shaft 76 turns, operating cam 77 which deflects contact maker 78 to engage fixed contact 80 periodically, thus applying energy through a low impedance path to ringing wire 74 to operate the audible signal at the station being called. During this period, relay 68 deenergizes because it is shorted by contacts 78 and 80. Motor 70 continues to turn because cam 81 closes contacts 82, 83 which short relay contacts 68'. At the end of the period of closure of contacts 82, 83, relay 68 will again operate if the audible signal is still connected to lines 73, 74. The motor will thus continue to operate either through closure of contact 68', or 82, 83 or both. When all audible signals have been removed from the ringing feeders relay 68 ceases to operate and its contacts open. The motor will then only continue to operate until cam 81 reaches a position where it opens contacts 82, 83. This position is desirably chosen to be just before the position of angular rotation where cam 77 closes contacts 78, 80. Thus when contacts 78, 80 shunt the coil of relay 68 and it falls back, contacts 82, 83 will have already closed to keep the motor powered. By this arrangement when the ringing equipment starts on a new call a pulse of ringing power is immediately transmitted.

It is preferred to have a ringing period of about 1 second with three or four second intervals.

Another improvement in Figure 4 is that the ringing source 75 may be a separate source of poorly filtered direct current or an alternating current source. If a transformer connected with the usual public utility power lines provides power for wires 73 and 74 in Figure 4, the only change required is that the relay 68 must then be an alternating current relay or a suitable rectifier must be used if a direct current relay is employed.

An additional advantage is that the audible signals in the set may be of the contactless type, with corresponding advantages in reducing maintenance, when alternating current is used. Particularly if known means are used for generating alternating currents higher in the audible frequency range, a loudspeaker in the set may be used as the audible signal device and in any case where alternating current signalling is used, non-mechanical interrupting devices such as saturable reactors or blocking oscillators are well-known equivalent means for the power source and current interrupter methods previously described in detail in illustrating the principles of my invention.

In view of my invention and disclosure variations and modifications to meet individual whim or particular need will doubtless become evident to others skilled in the art, to obtain all or part of the benefits of my invention without copying the structure shown, and I, therefore, claim all such insofar as they fall within the reasonable spirit and scope of my claims.

Having thus described my invention what I claim as new and desire to secure by Letters Patent is:

1. An intercommunicating telephone equipment of the direct call secrecy type having a local talking circuit, a transmitter and a receiver in the local talking circuit, a transformer having a winding connected with the local talking circuit, a privacy relay operatively connected in the equipment and having contacts inserted in a circuit comprising a winding of the transformer, outgoing lines to called stations, an incoming line, the transformer winding being connected to one of the lines, signalling means in each station, means operative at one station for selectively energizing the signalling means at a remote station, means operative when the remote station answers for connecting talking current with the remote station through the transformer winding, and a power source operatively connected to the equipment.

2. An intercommunicating telephone equipment of the direct call secrecy type, having a local talking circuit, a transmitter and a receiver in the local talking circuit, a privacy relay operatively connected to the telephone equipment and having contacts, a first winding of a first transformer connected in circuit with said privacy relay contacts and the local talking circuit, a first winding of a second transformer connected to the local talking circuit, outgoing lines to called stations, a second winding of the first transformer operatively connected to the outgoing lines from the particular station, an incoming line, a second winding of the second transformer connected to the incoming line, signalling means at each station, means operative at one station for selectively energizing the signalling means at a remote station, means operative when the remote station answers for connecting talking current with the remote station and power means operatively connected to the equipment.

3. An intercommunicating telephone equipment according to claim 2, in combination with a center tap on the second winding of the first transformer, a privacy relay having contacts connected with the local talking circuit, a circuit operatively connecting the center tap of the second winding of the first transformer with the coil of the privacy relay, a center tap on the second winding of the second transformer, a hook switch having hook switch contacts and operated by the receiver, and a circuit operatively connecting the center tap of the second winding of the second transformer and a hook switch contact with the local signalling means.

4. An intercommunicating telephone equipment according to claim 2, in combination with a privacy relay having a make contact set and a break contact set, a center tap on the second winding of the first transformer, a circuit connection from the coil of the privacy relay to the center tap of the second winding of the first transformer, means operatively connected through the make contact set of the privacy relay for lowering the effective resistance of the coil of the privacy relay when it operates, a center tap on the second winding of the second transformer, a circuit operatively connecting the center tap of the second winding of the second transformer and the power source so as to mark its own home line busy by opening the circuit.

5. An intercommunicating telephone equipment according to claim 4, in combination with a hook switch having contacts operated by the receiver, the local signalling means being connected between the center tap of the second winding of the second transformer and the uninterrupted power source, and the hook switch contacts being adapted to disconnect the local signalling means from the power source, and resistance means inserted in the circuit by the hook switch means.

6. An intercommunicating telephone equipment according to claim 2, there being normally open privacy relay contacts in the local talking circuit, calling switches having normally closed contacts and a circuit shunting the normally open privacy relay contacts through the normally closed contacts of all of the ringing switches, whereby a busy signal is provided when the called line is busy by the dead sound in the receiver of the calling station.

7. An intercommunicating telephone equipment of the direct call secrecy type having a local talking circuit, a transmitter and receiver in the local talking circuit, a power source, a power line from the power source to each station, outgoing lines to called stations, an incoming line, auditory signalling means at each station, means operative at one station for selectively energizing the signalling means at a remote station and means operative when the remote station answers for connecting talking current with the remote station, in combination with a call receiving relay at each station, the signalling means at that station being activated through contacts of the call receiving relay, a current interrupter and a source of power for operating the signalling means connected through the current interrupter and the contacts of the call receiving relay.

8. An intercommunicating equipment of the direct call secrecy type having a local talking circuit, a transmitter and receiver in the local talking circuit, a power source, outgoing lines to called stations, an incoming line, auditory signalling means at each station, a plurality of calling switches at each station connected with the outgoing lines, the source of power being selectively connected to the outgoing lines by the calling switches, a call receiving relay connected to the incoming line and operable by said source of power, a current interrupter and electric power means interconnecting the auditory signalling means, the call receiving relay contacts and the current interrupter.

9. An intercommunicating telephone equipment according to claim 8, in combination with feeder wires distributing interrupted current from the current interrupter and the power source to the various stations of the system.

10. An intercommunicating telephone system according to claim 9, in combination with starting relay means for the current interrupter.

11. In an intercommunicating telephone equipment, a ringing power source, ringing supply feeders, one of which is connected to one side of the ringing power source, a high resistance relay having its coil connected between the other ringing supply feeder and the opposite side of the ringing power source and having normally open contacts, an interrupter power source, an interrupter motor, two sets of normally open interrupter contacts, cam means driven by the interrupter motor for closing the interrupter contact sets, circuit means connecting the interrupter motor to the interrupter power source through the relay contacts and one set of interrupter contacts in parallel, and circuit means connecting the other ringing supply feeder through the other set of interrupter contacts to the other side of the ringer power source.

References Cited in the file of this patent

UNITED STATES PATENTS 2,764,632 Adler ------------------ Sept. 25, 1956